US008453250B2

(12) United States Patent
Amimoto

(10) Patent No.: US 8,453,250 B2
(45) Date of Patent: May 28, 2013

(54) OPTION MANAGEMENT SYSTEM, METHOD AND RECORDING MEDIUM FOR DIGITAL DEVICE

(75) Inventor: Masanao Amimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 12/742,040

(22) PCT Filed: Nov. 21, 2008

(86) PCT No.: PCT/JP2008/071271
§ 371 (c)(1),
(2), (4) Date: May 7, 2010

(87) PCT Pub. No.: WO2009/075181
PCT Pub. Date: Jun. 18, 2009

(65) Prior Publication Data
US 2011/0162079 A1    Jun. 30, 2011

(30) Foreign Application Priority Data
Dec. 10, 2007 (JP) .................................. 2007-318249

(51) Int. Cl.
G06F 21/22       (2006.01)
(52) U.S. Cl.
USPC .......................................... 726/26; 380/201
(58) Field of Classification Search
None
See application file for complete search history.

(56) References Cited

U.S. PATENT DOCUMENTS

| 7,346,584 | B2 * | 3/2008 | Hamada et al. ................. 705/51 |
| 2004/0205261 | A1 * | 10/2004 | Osada ............................... 710/8 |
| 2009/0216855 | A1 * | 8/2009 | Lang et al. ..................... 709/217 |
| 2010/0250960 | A1 * | 9/2010 | Ogura ............................ 713/189 |

FOREIGN PATENT DOCUMENTS

| JP | 10-49048 A | 2/1998 |
| JP | 2001-222424 A | 8/2001 |
| JP | 2003-067072 A | 3/2003 |
| JP | 2004-118584 A | 4/2004 |
| JP | 2004-213469 A | 7/2004 |
| JP | 2007-259315 A | 10/2007 |
| WO | WO-2006112794 | * 3/2005 |
| WO | 2006/112794 A | 10/2006 |

OTHER PUBLICATIONS

International Search Report for PCT/JP2008/071271, mailed Feb. 10, 2009.
Russian Office Action for RU2010128527/08(040542) dated Apr. 27, 2011.

* cited by examiner

Primary Examiner — Fikremariam A Yalew

(57) ABSTRACT

This invention provides an option management system, an option management method and a recording medium for a digital device which can charge expenses when an optional function is added, and is superior in the convenience and security. The option management system comprises a user terminal, a client terminal, and a digital device connected via a network to the user terminal and the client terminal, which performs a control process for validation or invalidation if a license key purchased by the user for an optional function of each software for monitoring, controlling and maintaining the device itself is inputted from the user terminal.

6 Claims, 3 Drawing Sheets

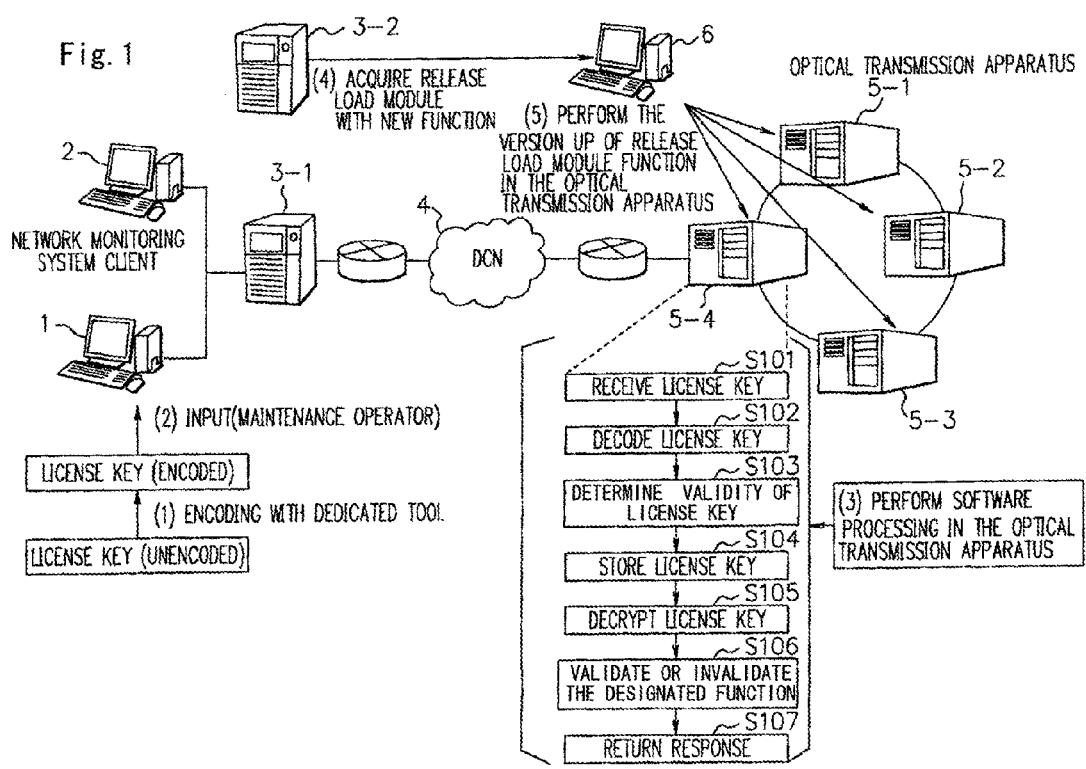

Fig. 2A

| ← ID PART → | (2) | ← (3) → | | |
|---|---|---|---|---|
| * | * | * | * | -00 | -00 | -00 | -00 |

\*ONE QUADRILATERAL IS ONE BYTE

Fig. 2B

| 7 | 6 | 5 | 4 | 3 | 2 | 1 | 0 | bit |
|---|---|---|---|---|---|---|---|---|
| — | — | — | — | KEY ARRANGEMENT | | | | |

\*—: UNUSED. COMPENSATED WITH VALUE 0.

Fig. 2C

| 7 | 6 | 5 | 4 | 3 | 2 | 1 | 0 | bit |
|---|---|---|---|---|---|---|---|---|
| — | — | — | — | b | b | b | b | |

\*—: UNUSED. COMPENSATED WITH VALUE 0.

OPTION MANAGEMENT SYSTEM, METHOD AND RECORDING MEDIUM FOR DIGITAL DEVICE

TECHNICAL FIELD

The present invention relates to an option management system, an option management method and a recording medium for a digital device.

BACKGROUND ART

An optional function of software for the digital device such as an optical transmission apparatus is used at a user terminal via a network.

However, since the optical transmission apparatus has no license function, when the optional function of software is extended, the expense of upgrade cannot be charged to the user. Accordingly, the expense of software can be charged only when the hardware is purchased.

Therefore, in the case where the user purchases all the hardware at the time of newly introduction of the optical transmission device, the subsequent addition of the optional function of software is supported with no charge (no set price). Also, since the price was set for only the hardware of the optical transmission apparatus, it was impossible to configure a business model with addition of the optional function of software involving lowering the initial introduction price of the user and withdrawing the expenses in accordance with a use situation of the user after the introduction.

Thus, it has been proposed that the user gains access to the digital device such as an optical transmission apparatus from the user terminal using a license key. One example of such a technique was described in patent document 1 (Japanese Patent Laid Open Publication No. 2003-67072) and patent document 2 (Japanese Patent Laid Open Publication No. 2004-213469). Also, a technique associated with the patent documents 1 and 2 was described in patent document 3 (Japanese Patent Laid Open Publication No. 2007-259315).

The "digital device having an optional function" of patent document 1 is a digital device including various kinds of optional functions and being set not to operate the optional functions at the time of shipment, comprising means for storing an input license key by the user when the license key of the optional function is inputted by the user, means for judging an option type of the input license key to start a function corresponding to the concerned option type, means for reading a preset serial number of the digital device along with the input of the license key, means for creating the license key from the serial number with the function, and means for comparing the input license key with the created license key and starting the optional function corresponding to the type of the input license key if both license keys are matched. The digital device operates in the following way.

This digital device starts a function corresponding to the option type of the input license key, when the license key of the optional function is inputted by the user. Then the function creates a license key using the serial number. If this created license key and the input license key are matched, the optional function corresponding to the type of the input license key starts. Accordingly, the user does not need to ask the maker to withdraw the purchased digital device and install the option for the version up, whereby the user can save trouble.

The "image forming apparatus" of patent document 2 is an image forming apparatus comprising storage means for storing a plurality of programs for implementing apparatus identification information intrinsic to the apparatus and an optional function, program management means for holding starting program identification information indicating whether or not the plurality of programs are set as programs to be executed at the time of starting the apparatus, and license management means for granting use permission for the plurality of programs, in which the license management means includes license information acquisition means for acquiring, from an external apparatus, license information including apparatus specifying information and program specifying information for specifying one program designated as the program to be executed at the time of starting the apparatus, determination means for determining whether or not the program specified by the program specifying information is set as the program to be executed at the time of starting the apparatus by referring to the starting program identification information held in the program management means, if the apparatus specifying information included in the license information acquired by the license information acquisition means and the apparatus identification information stored in the storage means are matched, and the program specified by the program specifying information included in the license information corresponds to any of the plurality of programs, and update means for updating the starting program identification information held in the program management means to set the program specified by the program specifying information as the program to be executed at the time of starting the apparatus, if the determination means determines that the program specified by the program specifying information is not set as the program to be executed at the time of starting the apparatus. The image forming apparatus operates in the following way.

This image forming apparatus acquires, from the outside, license information including apparatus specifying information and program specifying information for specifying one program designated as the program to be executed at the time of starting the apparatus, determines whether or not the program specified by the program specifying information is set as the program to be executed at the time of starting the apparatus by referring to the starting program identification information, if the apparatus specifying information included in the acquired license information and the apparatus identification information stored in the storage means are matched, and the program specified by the program specifying information included in the license information corresponds to any of the plurality of programs, and updates the starting program identification information to set the program specified by the program specifying information as the program to be executed at the time of starting the apparatus, if it is determined that the program specified by the program specifying information is not set as the program to be executed at the time of starting the apparatus. Therefore, the program for implementing the optional function can be validated without taking an extra cost and the security for validating the optional function can be improved.

The "optical transmission apparatus, optical transmission method and optical transmission control program" of patent document 3 involves the optical transmission apparatus that sets an input/output band on an optical communication channel in an optical network of TDM method using the GMPLS (Generalized Multi-Protocol Label Switching), comprising optical communication channel change means for changing the input/output band used by the optical communication channel on the optical transmission line to the an adjacent optical transmission apparatus for each transmission line, and band adjustment means for rearranging, if the input/output bands used by the optical communication channel are arranged discontinuously on the optical transmission line, the discontinuously arranged input/output bands to continuous bands by controlling the optical communication channel change means. The apparatus operates in the following way.

The optical transmission apparatus rearranges the discontinuously arranged input/output bands to the continuous bands by controlling the optical communication channel change means for changing the input/output band used by the optical communication channel on the optical transmission line to the adjacent optical transmission apparatus for each transmission line, if the input/output bands used by the optical communication channel are arranged discontinuously on the optical transmission line. Therefore, fragmentary bands occurring on the optical transmission line can be resolved, whereby the degree of freedom in setting the path on the optical network can be improved.

DISCLOSURE OF INVENTION

Technical Problem

However, the above techniques as described in the patent documents 1 and 2 are inconvenient, because the license key is required in every operation, whereas the technique as described in the patent document 3 is insufficient in terms of security, because the software for monitoring, controlling and maintaining the optical transmission apparatus is provided but the use of the license key is not considered.

Thus, an exemplary object of the invention is to provide an option management system, an option management method and a recording medium for a digital device which can charge expenses when an optional function is added, and is superior in the convenience and security.

Technical Solution

A system according to an exemplary aspect of the present invention includes a user terminal, a client terminal, and a digital device, connected via a network to the user terminal and the client terminal, which performs a control process for validation or invalidation if a license key purchased by the user for an optional function of each software for monitoring, controlling and maintaining the device itself is inputted from the user terminal.

A method according to an exemplary aspect of the invention includes performing a control process for validation or invalidation if a license key purchased by a user is inputted for an optional function of each software for monitoring, controlling and maintaining a digital device.

A recording medium according to an exemplary aspect of the invention includes a program recorded therein to cause a computer, that is connected to a user terminal and a client terminal via a network, and additionally has an optional function of each software for monitoring, controlling and maintaining the device itself, to execute a control process for validation or invalidation if a license key purchased by the user is inputted from the user terminal.

Advantageous Effects

With the invention, it is unnecessary to input the license key at the initial stage, and only when the new optional function is introduced, the license key is inputted. Therefore, the expenses are charged when the optional function is added, thereby enhancing the convenience and the security.

BEST MODE FOR CARRYING OUT THE INVENTION

Features of the Invention

The present invention is characterized in that a charging system (business model by software) can be implemented by adding a control process for validation or invalidation in inputting a license key for an optional function of each software for monitoring, controlling and maintaining an optical transmission apparatus as a digital device.

Configuration

The invention is characterized by acquiring a release load module with a new function from a software management server if the new function other than the optional function of each software implemented beforehand in the release load module mounted on the optical transmission apparatus as the digital device is requested from a user. This release load module with the new function is exchanged for the release load module mounted on the optical transmission apparatus by a remote terminal.

After performing the exchange, the new function is enabled by inputting a license key validating the new function from a client terminal in a network monitoring system into the optical transmission apparatus.

The invention is characterized in that all the optional functions (SW) are mounted on the optical transmission apparatus as the digital device beforehand, and the option start or system expansion can be made with the license key purchased by the client separately, or the addition of SW or the version up of the mounted SW can be made later with the license key.

That is, the option management system for the digital device according to the invention includes a user terminal, a client terminal, and an optical transmission apparatus connected via a network to the user terminal and the client terminal, which performs a control process for validation or invalidation if a license key purchased by the user for an optional function of each software for monitoring, controlling and maintaining the device itself is inputted from the user terminal.

The optical transmission apparatus as the digital device includes means for receiving a license key, decoding means, means for determining validity, storing means, decrypting means, means for performing validation or invalidation of a designated function, and means for sending a response to a user terminal.

The means for receiving the license key may be a modem or router, for example. The decoding means may be a well-known decoder, for example. The means for determining the validity, the decrypting means and the means for performing the validation or invalidation of the designated function are configured by software installed in the optical transmission apparatus. The means for sending the response to the user terminal may be the modem or router as mentioned above, for example. The storing means may be a RAM (Random Access Memory), an HDD (Hard Disc Drive) or a flash memory, for example.

The license key is generated by a dedicated tool on the side of the optical transmission apparatus, and includes a dummy character string and a key ID part of key information after decoding.

The optical transmission apparatus stores the license key information in a plurality of (e.g., two) memories (non-volatile memory, for example, a flash memory) having a master and slave relationship within the apparatus, only if the license key is recognized as formal.

The currently incorporated apparatus will be described below as an example.

It is supposed that the optional function of each software implemented beforehand is already installed in the release load module mounted on the optical transmission apparatus as the digital device. Through this scheme, to validate the optional function of software, it is unnecessary to create the new release load module, and not needed to make the version up of the release load module.

A license key for setting the validity or invalidity for each optional function of software is prepared beforehand. If there is a request for adding the optional function of software from the user, the user purchases the license key prepared beforehand, and inputs the license key from the network monitoring system (client terminal) used by the user or the terminal into the optical transmission apparatus, whereby the required optional function of software can be validated. Also, with the currently set optional function of software, it is possible to confirm the optional function of software effective in each optical transmission apparatus from the network monitoring system (client terminal).

In this system, a charging system for the optional function of software (business model by software) can be realized by providing a new scheme for an encoding method of the license key incorporated into the software in the optical transmission apparatus and a storing method of the license key.
Program The option management system for the digital device according to the invention as described above is implemented by a program for executing a process on a computer. The computer may be a general-purpose computer, such as a personal computer or workstation, but the invention is not limited to this.

The program according to the invention causes a computer, that is connected to the user terminal and the client terminal via the network, and additionally has an optional function of each software for monitoring, controlling and maintaining the device itself, to execute (1) a control process for validation or invalidation if the license key purchased by the user is inputted from the user terminal.

Also, the program may cause the computer to execute (2) a process for receiving the license key from the user terminal (step S101), and a decoding process (step S102), (3) a process for determining the validity (step S103), (4) a storing process (step S104), (5) a decrypting process (step S105), (6) a process for validating a designated function (step S106), (7) a process for invalidating (step S106), and (8) a process for sending a response to the user terminal (step S107).

Further, the program may cause the computer to execute (9) a process for storing the license key information in two non-volatile memories having a master and slave relationship within the device, only if the license key is recognized as formal.

Also, the client terminal may use the license key for performing (a) a process for holding the license valid for each optional function of software, (b) a process for reading the license key information for every optical transmission apparatus at the same time, (c) a process for totalizing the number of licenses, (d) a process for comparing the total value with the number of licenses valid for each optional function of software held at the client terminal, and (e) a process for displaying a warning notification if unmatched.

Thereby, the option management system for the digital device according to the invention can be realized anywhere only if there is a computer environment where the program is executable.
<Recording Medium>

The program described above may be stored in a computer readable recording medium.

Herein, examples of the recording medium may include computer readable recording media such as CD-ROM (Compact Disc Read Only Memory), a flexible disk (FD), CD-R (CD Recordable) and DVD (Digital Versatile Disk), a flash memory, RAM, ROM (Read Only Memory), a semiconductor memory such as FeRAM (ferroelectric memory), and an HDD.

[Exemplary Embodiment 1]

After the license key is encrypted using a dedicated tool to prevent duplication, the user purchases the license key. Also, the optical transmission apparatus has additionally (α) a function of decoding the designated license key and determining the validity, (β) a function of storing the license key, (γ) a function of decrypting the content of the license key, and (δ) a function of validating or invalidating the optional function of software with the designated license key.

After purchasing the license key, the user inputs the license key from the network monitoring system (client terminal) into the optical transmission apparatus. In the optical transmission apparatus that receives the license key, after the license key is decoded, the validity for the license key is determined. If the license key is judged as valid, the designated content of the license key is decrypted to set the validity or invalidity for each optional function of software after the license key is stored in the non-volatile memory. After completion of this process, the result (normal or abnormal) of setting the validity or invalidity for each optional function of software is returned to the network monitoring system (client terminal), so that the user can judge whether or not the license key is normally set.
Configuration FIG. 1 is a concept view showing an example of the option management system for the digital device according to the invention. In FIG. 1, the license key is inputted from the network monitoring system (client terminal) into the optical transmission apparatus.

Each component of FIG. 1 will be described below.

The network monitoring system (client terminal) 2 is a system for periodically monitoring operating states (failure presence or absence, main signal state) of each of the optical transmission apparatuses 5-1 to 5-4 as the digital device. With the license key at this time, the user who operates the user terminal 1 gains access to each of the optical transmission apparatuses 5-1 to 5-4, using the network monitoring system (client terminal) 2, to set the validity or invalidity for the optional function of software.

Each of the optical transmission apparatuses 5-1 to 5-4 has a function of making the wavelength multiplexing of light for output to the transmission line and a function of making the wavelength de-multiplexing of light from the transmission line for output to a connection device. Each of the optical transmission apparatuses 5-1 to 5-4 mounts software having a function of making the settings for boost-up, maintenance and failure replacement for each of the apparatuses 5-1 to 5-4, and a function of periodically monitoring the operating states (failure presence or absence, main signal state) in which if a problem occurs in the operating states, a message is notified to the network monitoring system (client terminal) 2 to inform the user via the user terminal 1.

The software mounted on each of the optical transmission apparatuses 5-1 to 5-4 has a function of decoding the license key and determining the validity, a function of storing the license key, a function of decrypting the content of the license key, and a function of validating or invalidating the optional function of software with the designated license key.

The encryption of the license key is performed using a dedicated tool operating on a PC (personal computer).

In FIG. 1, reference numerals 3-1 and 3-2 denote a server, reference numeral 4 denotes a network, and reference numeral 6 denotes a terminal for making the version up of the release load module function within the optical transmission apparatus.

Operation

The specifications of the license key are shown below.

(I) The validity or invalidity of a plurality of optional functions of software can be set with one license key.

(II) The license key is encrypted using an encryption algorithm.

(III) A scheme for checking whether or not the license key is formal is incorporated. This scheme checks a dummy character string of the license key and a key ID part of key information after decoding to check the legality.

(IV) After deleting the dummy character string, encrypted key information is stored in the non-volatile memory within the apparatus.

(V) Construction of key information (8 bytes) after decoding is shown in FIGS. 2A to 2C.

FIGS. 2A to 2C are construction views of key information after decoding for use in the option management system for the digital device according to the invention.

From FIG. 2A, it can be found that twelve kinds of optional functions can be identified with one registration number (key type).

(i) Key ID part. 'DW42' is assumed.

An arbitrary character string of 8-bit ASCII code composed of a predefined number of characters.

In decoding the key information, if this character string is matched with the predefined character string, the key is judged as correct.

(ii) Key type number. (value range from 0 to 15)

The lower order four bits per byte are only used as shown in FIG. 2B.

(iii) Optional function information.

Each bit corresponds to the optional function, and the invalidity/validity is represented by 0/1 value.

The lower order four bits per byte are only used as shown in FIG. 2C. b: each bit corresponds to the optional function, and the invalidity/validity is represented by 0/1 value. Herein, the reason why the lower order four bits are only used in (2) and (3) is that the value of 0 to 15 is allocated to one character from 0 to F in hexadecimal.

The data row of this key information is encrypted using the encryption algorithm, and generated as the license key by inserting a dummy key of eight characters.

FIG. 3 is a flowchart in inputting the license key from the network monitoring system (client terminal) into the optical transmission apparatus.

The license key is inputted at TL1 (step S1).

The optical transmission apparatus into which the license key is inputted checks the parameters (number of characters of the license key) (step S2), determines whether or not the license key has 16 characters (step S3), and if the license key has other than 16 characters (step S3/No), returns an error response (step S13).

In the case of 16 characters (step S3/Yes), the license key (key information+dummy key) is decomposed (step S4), and the normality of the dummy key is checked (step S5).

As a result of checking the normality of the dummy key of 8 characters, if the dummy key is abnormal (step S6/Yes), an error response is returned. If the dummy key is normal (step S6/No), the key information is decoded (step S7), and if the character string in the ID part of key information is not read as formal (step S9/Yes), an error response is returned.

If all the above check conditions are cleared (step S9/No), the license key is recognized as formal. That is, the inputted license key information before deleting the dummy key is written into FROM. The optional function information after decoding is written into the CF card and RAM (step S10).

The newly registered optional function is notified of change (step S11).

The completion is displayed (step S12).

A specific example of encoding and decoding the license key will be described below.

[One Example of Encoding the License Key]
(A) DW420000 (key information)
↓ (encoding)
(B) VSC8DCL (key information after encoding)
↓ (dummy insertion)
(C) CVISXCH8YDACVLVN (license key)

[One Example of Decoding the License Key]
(A) CVISXCH8YDACVLVN (license key)
↓ (dummy deletion)
(B) VSC8DCLN (encoded key information after deleting dummy)
↓ (decoding)
(C) DW420000 (as DW42 appears in the ID part, the license key is judged as correct)

Only if the license key is recognized as formal, the license key information is stored in the non-volatile memory within the device. Two non-volatile memories are prepared and operated in the master and slave relationship. The irremovable non-volatile memory is preserved as a master and the removable non-volatile memory is preserved as a slave. Consequently, in the case that the non-volatile memory is brought from another apparatus and mounted, it is possible to prevent the apparatus from operating with the license key information of the non-volatile memory for another apparatus.

Since the non-volatile memory is in the master and slave relationship, even if a failure occurs, the license key can be restored (assured) with er of the information of master and slave. For confirming whether or not the stored license key is normal, it is possible to check whether or not the license key is valid by comparison with the check sum information, because the license key with the check sum information added is backed up.

In the case where the license key can be normally stored in the non-volatile memory, the content of the license key is decrypted, and the optional function of software that is validated or invalidated with the license key at this time is set. After completion of the operation, a process completion response is returned to the optical transmission apparatus.

Exemplary Embodiment

Another exemplary embodiment of the invention will be described below. The network monitoring system (client terminal) holds (manages) the number of licenses valid for each optional function of software. The license key information is read from the network monitoring system (client terminal) to all the optical transmission apparatuses at the same time once a day, and the number of licenses valid for each optional function of software is totalized. A scheme, in which the number of licenses valid for each optional function of software held (managed) in the network monitoring system (client terminal) is compared with the total value, and if unmatched, a warning is displayed to the user for confirming, is added. Thereby, it is possible to detect a setting error of the license key that is set for each optical transmission apparatus or check whether or not the license key other than purchased by the user is used.

Advantages of the Invention

Conventionally, since the optical transmission apparatus was not managed with the license key, the optional function of software could not be sold separately from the price of the apparatus, even if the optical transmission apparatus was released to the user.

In this exemplary embodiment, the software of the optical transmission apparatus has a scheme for managing the validity or invalidity of the optional function of software with the license key, whereby the optional function of software usable for each user can be managed with the license key.

When there is a request for additional function from the user, the user purchases the license key, and inputs the license key from the network monitoring system (client terminal) used by the user, whereby the additional optional function of software is enabled.

In the case of newly introducing the optical transmission apparatus, the basic functions are limited (e.g., 80 packages can be physically mounted, but the registered number of packages is limited to 20 by the license key) by using the license key, whereby the initial introduction price of the optical transmission apparatus can be lowered, and the competitive products can be realized.

The user can purchase the license key for the additional optional function of software at the time when it is predicted that 20 or more packages will be employed in accordance with an operating situation of the optical transmission apparatus. Accordingly, the price can be set in accordance with the use purpose of the user.

Herein, a modification of the invention will be described below.

An option management method for a digital device according to the invention comprises performing a control process for validation or invalidation if the license key purchased by the user for the optional function of each software for monitoring, controlling and maintaining the digital device is inputted.

Also, in addition to the above method, the method further comprises decoding, determining the validity, storing, decrypting, performing the validation or invalidation of a designated function, and sending a response, if the license key is received.

Also, in addition to the above method, the method further comprises storing the license key information in a plurality of memories having a master and slave relationship within the apparatus, only if the license key is recognized as formal.

Also, in addition to the above method, the method further comprises holding the license key valid for each optional function of software, reading the license key information for every digital device from the client terminal at the same time, totalizing the number of licenses, comparing the total value with the number of licenses valid for each optional function of software held at the client terminal, and displaying a warning notification if unmatched.

Herein, the inventions as described in the patent documents 1 to 3 and this application are compared.

Patent Document 1

Though the addition of the optional function with the license key is disclosed in the patent document 1, the addition of SW or the version up of implemented SW as in this application cannot be made.

Patent Document 2

Though implementing all the optional functions (SW) in advance is disclosed in the patent document 2, it is neither disclosed nor suggested that the validation of the option as in this application is made by the serviceman, not the user.

Patent Document 3

This patent document 3 is different in that the scheme for the license key is mounted on the optical transmission apparatus, and the requested function is executable in accordance with a request from the customer.

This application is the National Phase of PCT/JP2008/071271, filed on Nov. 21, 2008, which is based upon and claims the benefit of priority from Japanese paten application No. 2007-318249, filed on Dec. 10, 2007, the disclosure of which is incorporated herein in its entirety by reference.

BRIEF DESCRIPTION OF DRAWINGS

The exemplary objects and features of the present invention will become more apparent from the consideration of the following detailed description taken in conjunction with the accompanying drawings, in which:

FIG. 1 is a concept view showing an example of an option management system for a digital device according to the present invention;

FIGS. 2A, 2B and 2C are constitutional views of key information after decoding for use in the option management system for the digital device according to the invention.

EXPLANATION OF REFERENCE

Figure 3:
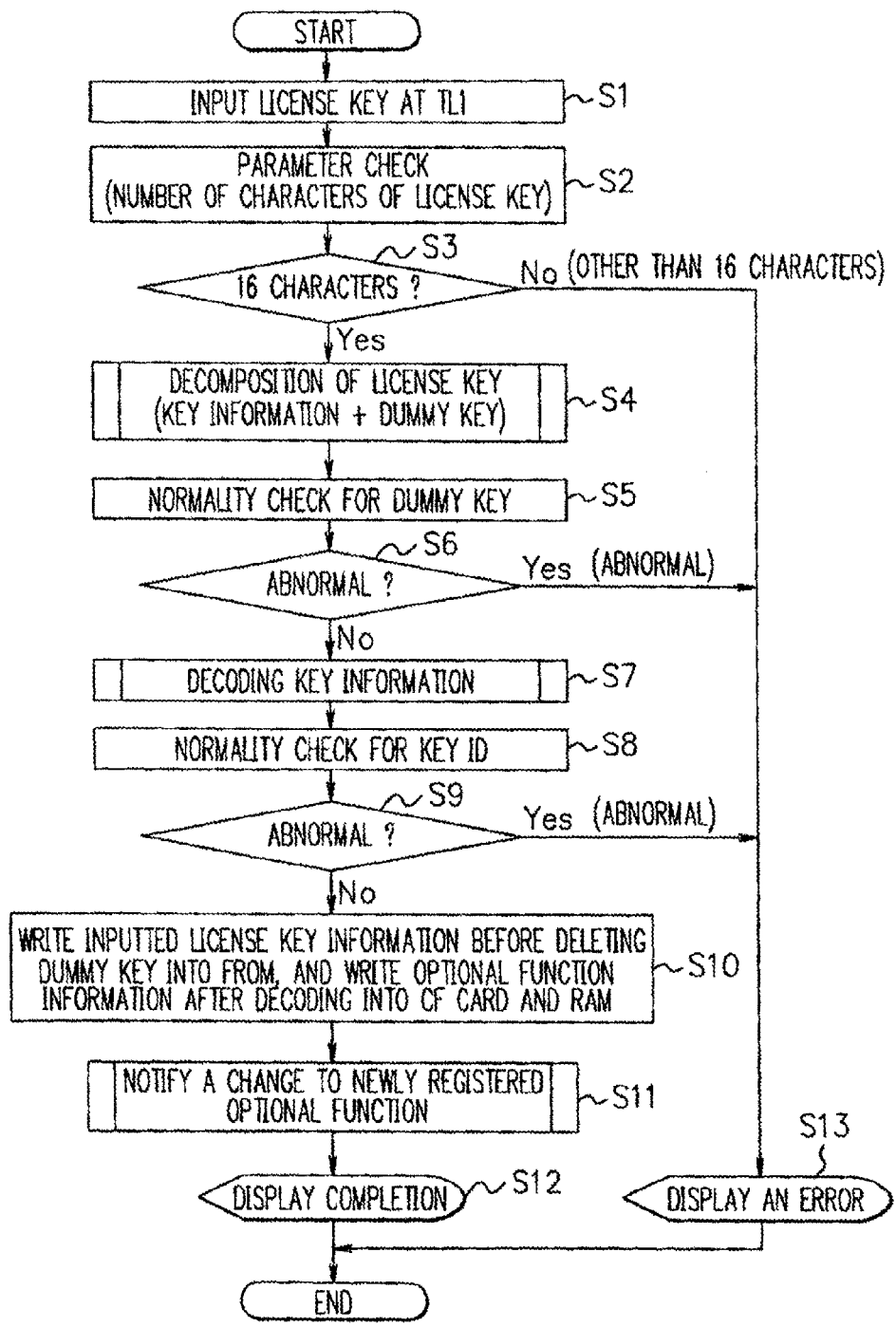
FIG. 3 is a flowchart in inputting a license key from a network monitoring system (client terminal) into an optical transmission apparatus.

1 user terminal
2 network monitoring system (client terminal)
3-1, 3-2 server
4 DCN (Data Communication Network)
5-1, ~5-4 digital device (optical transmission apparatus)
6 terminal

The invention claimed is:

1. An option management system for a digital device comprising:
   a user terminal;
   a client terminal; and
   a digital device connected via a network to the user terminal and the client terminal, which performs a control process for validation or invalidation if a license key purchased by the user for an optional function of each software for monitoring, controlling and maintaining the device itself is inputted from the client terminal,
   wherein the digital device acquires a new optional function from a sever, the new optional function enabled by performing the control process,
   the digital device comprises a receiving unit that receives the license key, a decoding unit, a determining unit that determines the validity, a storing unit, a decrypting unit, a performing unit that performs validation or invalidation of a designated function, and a sending unit that sends a response to the user terminal, and the client terminal holds the license valid for each optional function of software, reads the license key information to the digital device at the same time, totals the number of the licenses, compares the total value with the number of licenses valid for each optional function of software held in the client terminal, and displays a warning notification if unmatched.

2. The option management system for the digital device according to claim 1, wherein the license key is generated by a dedicated tool on the side of the digital device.

3. The option management system for the digital device according to claim 1, wherein the license key includes a dummy character string and a key ID part of key information after decoding.

4. The option management system for the digital device according to claim 1, wherein the digital device stores the license key information in a plurality of memories having a master and slave relationship within the device, only if the license key is recognized as formal.

5. An option management method for a digital device comprising:

performing a control process by the digital device or validation or invalidation if a license key purchased by a user for an optional function of each software for monitoring, controlling and maintaining the digital device is inputted;

acquiring a new optional function from a sever, the new optional function enabled by performing the control process;

decoding, determining the validity, storing, decrypting, performing the validation or invalidation of a designated function, and sending a response, if the license key is received;

storing the license key information in a plurality of memories having a master and slave relationship within the device only if the license key is recognized as formal; and holding the license valid for each optional function of software, reading the license key information from every digital device for the client terminal at the same time, totalizing the number of the licenses, comparing the total value with the number of licenses valid for each optional function of software held at the client terminal, unmatched.

6. A non-transitory computer readable medium for a digital device storing a program causing a computer, that is connected to a user terminal and a client terminal via a network, and additionally has an optional function of each software for monitoring, controlling and maintaining the device itself, to execute processing of:

performing a control process for validation or invalidation if a license key purchased by the user is inputted from the user terminal; and acquiring a new optional function from a server, the new optional function enabled by performing the control process, wherein the program further causes the computer to execute a decoding processes, a process for determining the validity, a storing process, a decrypting process, a process for validating a designated function, a process for invalidating, and a process for sending a response to the user terminal, if the license key is received, wherein the program further causes the computer to execute a process for storing the license key information in a plurality of memories having a master and slave relationship within the device, only if the license key is recognized as formal, and wherein the program further the client terminal to execute a process for holding the license valid for each optional function of software, a process for reading the license key information for every digital device at the same time, a process for totalizing the number of licenses, a process for comparing the total value with the number of licenses valid for each optional function of software held at the client terminal, and a process for displaying a warning notification if unmatched.

* * * * *